US012103050B2

(12) United States Patent
Yi

(10) Patent No.: US 12,103,050 B2
(45) Date of Patent: Oct. 1, 2024

(54) CLEANING DEVICE

(71) Applicant: TRIPLE WIN TECHNOLOGY(SHENZHEN) CO. LTD., Shenzhen (CN)

(72) Inventor: Jian-Cheng Yi, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 848 days.

(21) Appl. No.: 17/192,038

(22) Filed: Mar. 4, 2021

(65) Prior Publication Data

US 2022/0234084 A1 Jul. 28, 2022

(30) Foreign Application Priority Data

Jan. 28, 2021 (CN) ......................... 202120245196.6

(51) Int. Cl.

*B08B 7/04* (2006.01)
*B05C 21/00* (2006.01)
*B08B 7/00* (2006.01)
*B08B 13/00* (2006.01)
*H05B 1/02* (2006.01)
*B08B 9/043* (2006.01)

(52) U.S. Cl.

CPC .............. *B08B 13/00* (2013.01); *B05C 21/00* (2013.01); *B08B 7/0085* (2013.01); *H05B 1/0244* (2013.01); *B08B 9/0436* (2013.01); *B08B 2209/032* (2013.01); *B08B 2209/04* (2013.01); *B08B 2220/01* (2013.01)

(58) Field of Classification Search

CPC .... B08B 3/00; B08B 3/04; B08B 3/08; B08B 3/10; B08B 3/006; B08B 7/0071; B08B 7/0085; B08B 7/04; B08B 1/00; B08B 1/10; B08B 1/16; B08B 1/165; B08B 2220/01; B05C 21/00; B05B 15/50; B05B 15/52; B05B 15/522; B05B 15/55; B05B 15/555; B41J 2/16517; B41J 2/1652; B41J 2/16535; B41J 2/16538; B41J 2/16552; B41J 2/16558; B41J 2/1657

See application file for complete search history.

(56) References Cited

U.S. PATENT DOCUMENTS 10,864,640 B1 * 12/2020 Innes .................... B08B 9/0933
2013/0310980 A1 * 11/2013 Matsuoka ............ B25J 15/0004 700/260
2016/0074911 A1 * 3/2016 Dore ....................... B29C 64/35 134/56 R
2018/0009007 A1 * 1/2018 Craft ....................... B08B 7/026

* cited by examiner

*Primary Examiner* — David G Cormier
(74) *Attorney, Agent, or Firm* — ScienBiziP, P.C.

(57) ABSTRACT

A cleaning device includes a supporting mechanism, a clamping mechanism arranged on the supporting mechanism and used to clamp a spray head, a heating mechanism, an adjusting mechanism, and a cleaning mechanism. The heating mechanism, the adjusting mechanism, and the cleaning mechanism are arranged on the supporting mechanism. The heating mechanism is used to heat the spray head clamped by the clamping mechanism. The cleaning mechanism is used to inject cleaning liquid into the spray head, dredge the spray head, and detect the spray head. The adjusting mechanism is used to rotate and adjust a position of the cleaning mechanism to complete different tasks on the spray head.

20 Claims, 2 Drawing Sheets

CLEANING DEVICE

FIELD

The subject matter herein generally relates to cleaning devices, and more particularly to a cleaning device for cleaning residual glue from a glue dispenser.

BACKGROUND

In many production processes, a large number of dispensing processes are used to dispense glue. After dispensing operations are completed, dispensing needles or nozzles need to be cleaned. Common cleaning methods include ultrasonic cleaning and liquid injection cleaning. However, ultrasonic cleaning is not practical for cleaning thermosetting adhesives that have a small pore size and are blocked after curing. Furthermore, liquid injection cleaning has a long operation time and high requirements for proficiency.

BRIEF DESCRIPTION OF THE DRAWINGS

Implementations of the present disclosure will now be described, by way of embodiments, with reference to the attached figures.

DETAILED DESCRIPTION

Figure 1:
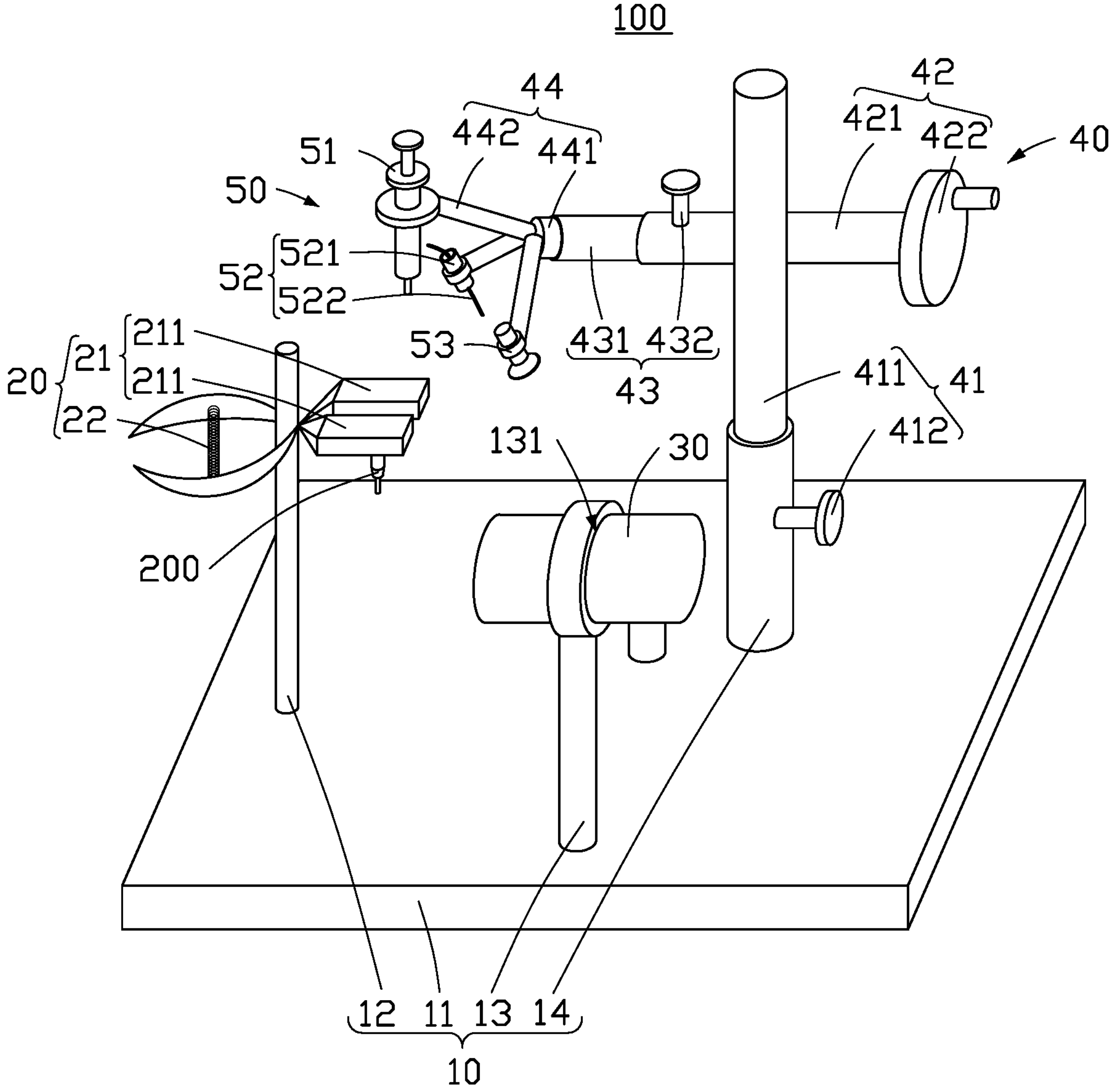
FIG. 1 is a perspective schematic view of a cleaning device according to an embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 shows an embodiment of a cleaning device 100 for cleaning a spray head 200 after dispensing glue. The cleaning device 100 includes a supporting mechanism 10, a clamping mechanism 20, a heating mechanism 30, an adjusting mechanism 40 and a cleaning mechanism 50. The clamping mechanism 20, the heating mechanism 30 and the adjusting mechanism 40 are arranged on the supporting mechanism 10. The cleaning mechanism 50 is arranged on the adjusting mechanism 40. The clamping mechanism 20 is used to clamp the spray head 200. The heating mechanism 30 is arranged adjacent to the clamping mechanism 20. The heating mechanism 30 is used to heat the spray head 200 clamped by the clamping mechanism 20 to decompose or carbonize glue in the spray head 200. The cleaning mechanism 50 can perform liquid injection, dredging, and inspection on the spray head 200. The adjusting mechanism 40 is used to adjust a rotation of the cleaning mechanism 50 so that the cleaning mechanism 50 can complete different tasks.

In one embodiment, the spray head 200 is a dispensing needle. In other embodiments, the spray head 200 may be a spray valve nozzle or other dispensing structure.

The supporting mechanism 10 includes a supporting plate 11, a clamping base 12, a heating base 13 and an adjusting base 14. The clamping base 12, the heating base 13, and the adjusting base 14 are arranged on the supporting plate 11. The clamping mechanism 20 is arranged on the clamping base 12. The heating mechanism 30 is arranged on the heating base 13. The adjusting mechanism 40 is arranged on the adjusting base 14.

The clamping mechanism 20 includes a clamping jaw 21 and a clamping driving member 22 coupled to the clamping jaw 21. The clamping jaw 21 includes two clamping fingers 211. The clamping driving member 22 drives the two clamping fingers 211 to approach each other to clamp the spray head 200.

In some embodiments, the clamping jaw 21 and the clamping driving member 22 are respectively a clamp and a spring. The spring is arranged on the clamp, and the clamp is arranged on the clamping base 12. The spring is used to maintain the clamp in a clamping state. In other embodiments, the clamping driving member 22 may also be an air cylinder, a motor, etc, such that the clamping driving member 22 is arranged on the clamping base 12, and the two clamping fingers 211 are respectively coupled to two driving ends of the clamping driving member 22.

A non-slip coating (not shown) is provided on a surface of each clamping finger 211 facing the other clamping finger 211 to prevent the spray head 200 from slipping when being clamped.

The heating base 13 defines a mounting hole 131. The heating mechanism 30 is received in the mounting hole 131, and a heating end of the heating mechanism 30 faces the clamping fingers 211.

The heating mechanism 30 heats a remaining amount of thermosetting glue in the spray head 200, so that the remaining amount of thermosetting glue is decomposed or carbonized by heating.

In one embodiment, the heating mechanism 30 is a heat gun. In other embodiments, the heating mechanism 30 may be a heating jacket with a telescopic function or other mechanism that can heat the spray head 200.

The adjusting mechanism 40 includes a height adjusting member 41, an angle adjusting member 42, a length adjusting member 43, and a mounting member 44. The height adjusting member 41 is arranged on the adjusting base 14. The angle adjusting member 42 is arranged on the height adjusting member 41. The length adjusting member 43 is arranged on the angle adjusting member 42. The mounting member 44 is arranged on the length adjusting member 43. The cleaning mechanism 50 is arranged on the mounting member 44. The length adjusting member 43 can adjust a horizontal distance between the mounting member 44 and the clamping mechanism 20 so that the cleaning mechanism 50 is adjacent to the spray head 200 in a horizontal direction. The angle adjusting member 42 can adjust a rotation angle of the mounting member 44 to rotate the cleaning mechanism 50 to perform different operations on the spray head 200. The height adjusting member 41 can adjust a height of the mounting member 44 so that the cleaning mechanism 50 is adjacent to the spray head 200 in a vertical direction.

The height adjusting member 41 includes a height adjusting rod 411 and an adjusting nut 412. The height adjusting rod 411 is slidably arranged on the adjusting base 14. The adjusting nut 412 is arranged on the adjusting base 14 and coupled to the height adjusting rod 411. The adjusting nut 412 can adjust a position of the height adjusting rod 411 on the adjusting base 14 to adjust the height of the cleaning mechanism 50.

The angle adjusting member 42 includes an angle adjusting rod 421 and a hand wheel 422. The angle adjusting rod 421 is rotationally arranged on the height adjusting rod 411. The hand wheel 422 is arranged on the angle adjusting rod 421. An angle of rotation of the angle adjusting rod 421 can be manually adjusted through the hand wheel 422 to rotate the cleaning mechanism 50 to perform different operations on the spray head 200.

The length adjusting member 43 includes a length adjusting rod 431 and a fixing nut 432. The length adjusting rod 431 is slidably arranged on the angle adjusting rod 421. The mounting member 44 is arranged on a side of the length adjusting rod 431 adjacent to the clamping mechanism 20. The fixing nut 432 is arranged on the angle adjusting rod 421 and coupled to the length adjusting rod 431. The fixing nut 432 can adjust a length of the length adjusting rod 431 extending from the angle adjusting rod 421 to adjust the horizontal distance between the cleaning mechanism 50 and the clamping mechanism 20.

The mounting member 44 includes a fixed end 441 and at least three operation ends 442. The fixed end 441 is arranged on the length adjusting rod 431. The at least three operation ends 442 are coupled to an end of the fixed end 441 away from the length adjusting rod 431 and extend in different directions.

In one embodiment, the three operation ends 442 are evenly spaced apart on the fixed end 441. In other embodiments, the three operation ends 442 can be spaced apart at different angles as required.

Figure 2:
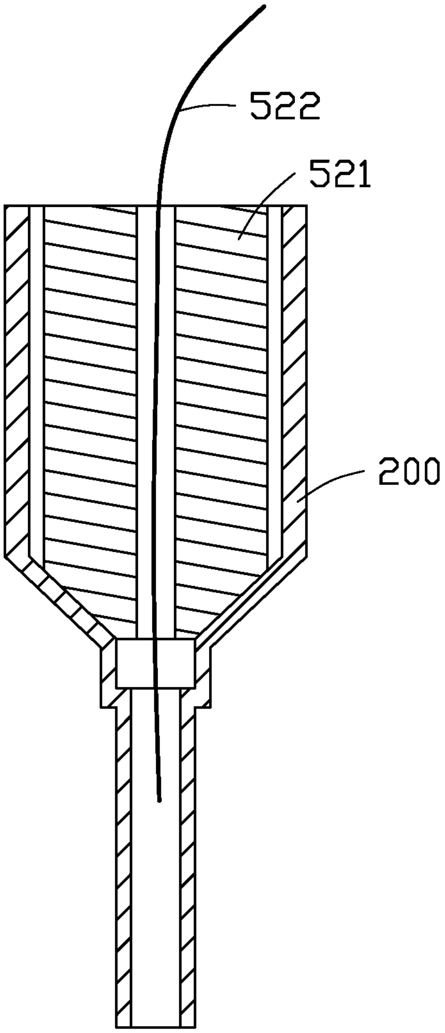
FIG. 2 is a cross-sectional view of a dredging unit shown in FIG. 1 extending into a spray head.

Referring to FIG. 1 and FIG. 2, the cleaning mechanism 50 includes a liquid injection unit 51, a dredging unit 52 and a detection unit 53. The liquid injection unit 51, the dredging unit 52, and the detection unit 53 are respectively arranged in one of the operation ends 442. The liquid injection unit 51 is used to inject cleaning liquid into the spray head 200. The dredging unit 52 is used to dredge holes of the spray head 200. The detection unit 53 is used to detect whether the spray head 200 is cleaned.

For different types of glue remaining in the spray head 200, the cleaning solution used by the liquid injection unit 51 is also different. Silver glue/UV curing glue is generally dissolved and dredged by anhydrous alcohol. Thermosetting glue (vinyl) is generally dissolved and dredged by acetone or other strong solvent.

In one embodiment, the liquid injection unit 51 is a needle syringe. In other embodiments, the liquid injection unit 51 may be a dropper or the like.

The dredging unit 52 includes a guiding member 521 and a wire member 522. The guiding member 521 is arranged on the operation end 442. The wire member 522 passes through the guiding member 521. The wire member 522 is used to extend into a hole of the spray head 200 to dredge the hole.

An end of the guiding member 521 is contoured to an injection end of the spray head 200, so that the wire member 522 is aligned with the hole of the spray head 200 for dredging.

In one embodiment, the wire member 522 is made of tungsten. In other embodiments, the wire member 522 can be made of other materials according to a type of the spray head 200 and a type of the residual glue.

In one embodiment, the detection unit 53 is a microscope with an external light source. In other embodiments, the detection unit 53 may be a CCD camera.

In use, the spray head 200 to be cleaned is first clamped by the clamping fingers 211. Then, the spray head 200 is heated by the heating mechanism 30 to decompose or carbonize the internal residue glue. Then, the adjusting mechanism 40 moves and rotates the cleaning mechanism 50 toward the spray head 200, and the liquid injection unit 51 injects cleaning liquid into the hole of the spray head 200 to dissolve residual glue in the hole. Then, the cleaning mechanism 50 is rotated to move the dredging unit 52 toward the spray head 200 and align the guiding member 521 with the injection end of the spray head 200, so that the wire member 522 penetrates the hole of the spray head 200 to dredge the residual glue. Finally, the cleaning mechanism 50 is rotated to make the detection unit 53 face the spray head 200 to detect if the spray head 200 is cleaned.

The above-mentioned cleaning device 100 heats the spray head 200 through the heating mechanism 30 and rotates and adjusts the position of the cleaning mechanism 50 through the adjusting mechanism 40, so that the cleaning mechanism 50 performs liquid injection, dredging, and inspection on the spray head 200, thereby rapidly cleaning and detecting the spray head 200. Therefore, operation of the cleaning device 100 is convenient, and cleaning efficiency is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A cleaning device comprising:

a supporting mechanism;

a clamping mechanism arranged on the supporting mechanism and used to clamp a spray head;

a heating mechanism;

an adjusting mechanism; and a cleaning mechanism; wherein:

the heating mechanism, the adjusting mechanism, and the cleaning mechanism are arranged on the supporting mechanism;

the heating mechanism is used to heat the spray head clamped by the clamping mechanism;

the cleaning mechanism comprises a liquid injection unit, a dredging unit, and a detection unit; the liquid injection unit, the dredging unit, and the detection unit are respectively arranged on the adjusting mechanism;

the liquid injection unit is used to inject cleaning liquid into the spray head which heated by the heating mechanism;

the dredging unit comprises a guiding member and a wire member, and the guiding member is arranged on the adjusting mechanism, and the wire member passes through the guiding member, the wire member is used to extend into a hole of the spray head to dredge the hole; and the detection unit is used to detect whether the spray head is cleaned;

the adjusting mechanism is used to rotate and adjust a position of the liquid injection unit, the dredging unit, and the detection unit to complete different tasks on the spray head.

2. The cleaning device of claim 1, wherein:

the supporting mechanism comprises a supporting plate, a clamping base, a heating base, and an adjusting base;

the clamping base, the heating base, and the adjusting base are arranged on the supporting plate;

the clamping mechanism is arranged on the clamping base;

the heating mechanism is arranged on the heating base; and the adjusting mechanism is arranged on the adjusting base.

3. The cleaning device of claim 2, wherein:

the clamping mechanism comprises a clamping jaw and a clamping driving member coupled to the clamping jaw;

the clamping jaw comprises two clamping fingers; and the clamping jaw drives the two clamping fingers to move toward each other to clamp the spray head.

4. The cleaning device of claim 2, wherein:

the heating base defines a mounting hole;

the heating mechanism is received in the mounting hole; and a heating end of the heating mechanism faces the clamping mechanism.

5. The cleaning device of claim 2, wherein:

the adjusting mechanism comprises a height adjusting member, an angle adjusting member, a length adjusting member, and a mounting member;

the height adjusting member is arranged on the adjusting base;

the angle adjusting member is arranged on the height adjusting member;

the length adjusting member is arranged on the angle adjusting member;

the mounting member is arranged on the length adjusting member;

the cleaning mechanism is arranged on the mounting member;

the length adjusting member is used to adjust a horizontal distance between the mounting member and the clamping mechanism;

the angle adjusting member is used to adjust a rotation angle of the mounting member; and the height adjusting member is used to adjust a height of the mounting member.

6. The cleaning device of claim 5, wherein:

the height adjusting member comprises a height adjusting rod and a height adjusting nut;

the height adjusting rod is slidably arranged on the adjusting base;

the height adjusting nut is arranged on the adjusting base and coupled to the height adjusting rod; and the height adjusting nut is used to adjust a position of the height adjusting rod on the adjusting base.

7. The cleaning device of claim 6, wherein:

the angle adjusting member comprises an angle adjusting rod and a hand wheel;

the angle adjusting rod is rotationally arranged on the height adjusting rod; and the hand wheel is arranged on the angle adjusting rod.

8. The cleaning device of claim 7, wherein:

the length adjusting member comprises a length adjusting rod and a fixing nut;

the length adjusting rod is slidably arranged on the angle adjusting rod;

the mounting member is arranged on an end of the length adjusting rod adjacent to the clamping mechanism;

the fixing nut is arranged on the angle adjusting rod and coupled to the length adjusting rod; and the fixing nut is used to adjust a length of the length adjusting rod extending from the angle adjusting rod.

9. The cleaning device of claim 8, wherein:

the mounting member comprises a fixed end and at least three operation ends;

the fixed end is arranged on the length adjusting rod; and the at least three operation ends are connected to an end of the fixed end away from the length adjusting rod and extend in different directions.

10. The cleaning device of claim 9, wherein:

the liquid injection unit, the dredging unit, and the detection unit are respectively arranged on one of the operation ends.

11. A cleaning device comprising:

a supporting mechanism;

a clamping mechanism arranged on the supporting mechanism and used to clamp a spray head;

a heating mechanism arranged on the supporting mechanism and used to heat the spray head clamped by the clamping mechanism;

a cleaning mechanism arranged on the supporting mechanism and used to perform different tasks on the spray head; the cleaning mechanism comprises a liquid injection unit, a dredging unit, and a detection unit; the liquid injection unit, the dredging unit, and the detection unit are respectively arranged on an adjusting mechanism; the liquid injection unit is used to inject cleaning liquid into the spray head which heated by the heating mechanism; the dredging unit comprises a guiding member and a wire member, and the guiding member is arranged on the adjusting mechanism, and the wire member passes through the guiding member, the wire member is used to extend into a hole of the spray head to dredge the hole; and the detection unit is used to detect whether the spray head is cleaned; and the adjusting mechanism arranged on the supporting mechanism and used to adjust a horizontal direction, a vertical direction, and a rotation angle of the cleaning mechanism liquid injection unit, the dredging unit, and the detection unit to complete the different tasks on the spray head.

12. The cleaning device of claim 11, wherein:

the supporting mechanism comprises a supporting plate, a clamping base, a heating base, and an adjusting base;

the clamping base, the heating base, and the adjusting base are arranged on the supporting plate;

the clamping mechanism is arranged on the clamping base;

the heating mechanism is arranged on the heating base; and the adjusting mechanism is arranged on the adjusting base.

13. The cleaning device of claim 12, wherein:
the clamping mechanism comprises a clamping jaw and a clamping driving member coupled to the clamping jaw;
the clamping jaw comprises two clamping fingers; and
the clamping jaw drives the two clamping fingers to move toward each other to clamp the spray head.

14. The cleaning device of claim 13, wherein:
the heating base defines a mounting hole;
the heating mechanism is received in the mounting hole; and
a heating end of the heating mechanism faces the clamping mechanism.

15. The cleaning device of claim 14, wherein:
the adjusting mechanism comprises a height adjusting member, an angle adjusting member, a length adjusting member, and a mounting member;
the height adjusting member is arranged on the adjusting base;
the angle adjusting member is arranged on the height adjusting member;
the length adjusting member is arranged on the angle adjusting member;
the mounting member is arranged on the length adjusting member;
the cleaning mechanism is arranged on the mounting member;
the length adjusting member is used to adjust a horizontal distance between the mounting member and the clamping mechanism;
the angle adjusting member is used to adjust a rotation angle of the mounting member; and
the height adjusting member is used to adjust a height of the mounting member.

16. The cleaning device of claim 15, wherein:
the height adjusting member comprises a height adjusting rod and a height adjusting nut;
the height adjusting rod is slidably arranged on the adjusting base;
the height adjusting nut is arranged on the adjusting base and coupled to the height adjusting rod; and
the height adjusting nut is used to adjust a position of the height adjusting rod on the adjusting base.

17. The cleaning device of claim 16, wherein:
the angle adjusting member comprises an angle adjusting rod and a hand wheel;
the angle adjusting rod is rotationally arranged on the height adjusting rod; and
the hand wheel is arranged on the angle adjusting rod.

18. The cleaning device of claim 17, wherein:
the length adjusting member comprises a length adjusting rod and a fixing nut;
the length adjusting rod is slidably arranged on the angle adjusting rod;
the mounting member is arranged on an end of the length adjusting rod adjacent to the clamping mechanism;
the fixing nut is arranged on the angle adjusting rod and coupled to the length adjusting rod; and
the fixing nut is used to adjust a length of the length adjusting rod extending from the angle adjusting rod.

19. The cleaning device of claim 18, wherein:
the mounting member comprises a fixed end and at least three operation ends;
the fixed end is arranged on the length adjusting rod; and
the at least three operation ends are connected to an end of the fixed end away from the length adjusting rod and extend in different directions.

20. The cleaning device of claim 19, wherein:
the liquid injection unit, the dredging unit, and the detection unit are respectively arranged on one of the operation ends.

* * * * *